(12) United States Patent
Park

(10) Patent No.: US 6,434,148 B1
(45) Date of Patent: Aug. 13, 2002

(54) DATA PACKET RE-SEQUENCER

(76) Inventor: Jae-Hyun Park, 176, Karak-dong, Songpa-gu, Seoul (KR)

( * ) Notice: Subject to any disclaimer, the term of this patent is extended or adjusted under 35 U.S.C. 154(b) by 0 days.

(21) Appl. No.: 09/467,684

(22) Filed: Dec. 21, 1999

(30) Foreign Application Priority Data

Dec. 28, 1998 (KR) ............................................ 98-59200

(51) Int. Cl.[7] .......................... H04L 12/28; H04L 12/56
(52) U.S. Cl. ..................... 370/394; 370/395.7; 370/412
(58) Field of Search ................................. 370/389, 392, 370/395.1, 395.7, 412, 394, 428, 429, 395.71, 395.72, 517, 503

(56) References Cited

U.S. PATENT DOCUMENTS

| | | | | |
|---|---|---|---|---|
| 4,839,891 A | * | 6/1989 | Kobayashi et al. | ......... 370/394 |
| 5,319,360 A | * | 6/1994 | Schrodi et al. | ............. 370/384 |
| 5,491,728 A | * | 2/1996 | Verhille et al. | ............. 370/384 |
| 5,936,966 A | * | 8/1999 | Ogawa et al. | ............... 370/384 |
| 6,002,686 A | * | 12/1999 | Mitts et al. | .................. 370/384 |

* cited by examiner

*Primary Examiner*—Ajit Patel
(74) *Attorney, Agent, or Firm*—Steve Cha; Klauber & Jackson

(57) ABSTRACT

A cell re-sequencer for re-sequencing the cells switched by an ATM switching system, comprises a maximum delay register for setting the maximum delay value by initialization to output the maximum delay value according to internal clock pulses, a base address increment register for increasing the initial value of the initialization set as a base address one by one according to cell time clock pulses, a delay detector for detecting the real delay of a cell from its header, a cell storing address generator for adding the base address to the delay difference between the maximum delay and real delay to generate a cell storing address, a multiplexer for multiplexing the base address and cell storing address according to the cell time clock pulses, and a memory address register for temporarily storing the output of the multiplexer.

22 Claims, 2 Drawing Sheets

DATA PACKET RE-SEQUENCER

CLAIM OF PRIORITY

This application makes reference to, incorporates the same herein, and claims all benefits accruing under 35 U.S.C. Section 119 from an application for DATA PACKET RE-SEQUENCER filed earlier in the Korean Industrial Property Office on Dec. 28, 1998 and there duly assigned Ser. No. 59200/1998.

BACKGROUND OF THE INVENTION

1. Field of the Invention

The present invention relates to an ATM (Asynchronous Transfer Mode) switching system, and more particularly a data re-sequencer used in an ATM switching system to re-sequence data packets.

2. Description of the Related Art

ATM is a high-speed digital communications process for use in ISDN applications which attempts to address many of the problems associated with the transmission and reception of several different types of information. For example, file transfer is most efficiently accomplished through connectionless communications with large packets, whereas real-time voice and video communication work best with a connection-oriented scheme and small packets. ATM has been designed to handle both of these types of information. The term "data packet" is hereinafter referred to as "data cell," which is a short fixed-length section of data transmitted as a unit in ATM. For example, the ATM switching system divides the transmitted information into a number of data cells, each of which may consist of 48 bytes including a 5-byte header.

Meanwhile, the ATM switching system switches the data cells coming into the input port through a single path or multiple paths. In the case of the single path, the switching system must be designed to have a much faster internal data processing speed than the speed of the cell coming into the input port in order to deal with the burst traffic. The multi-path switching system is developed to effectively deal with the speed problem of the single path switching system, which requires a multi-path and multi-stage switching network to have large capacity. However, the multi-path switching system may suffer undesirable transmission delay of the data cells because they are switched through the internal multiple paths to the output port. This requires re-sequencing of the data cells outputted through the output port in order to keep their original sequence.

Figure 1:
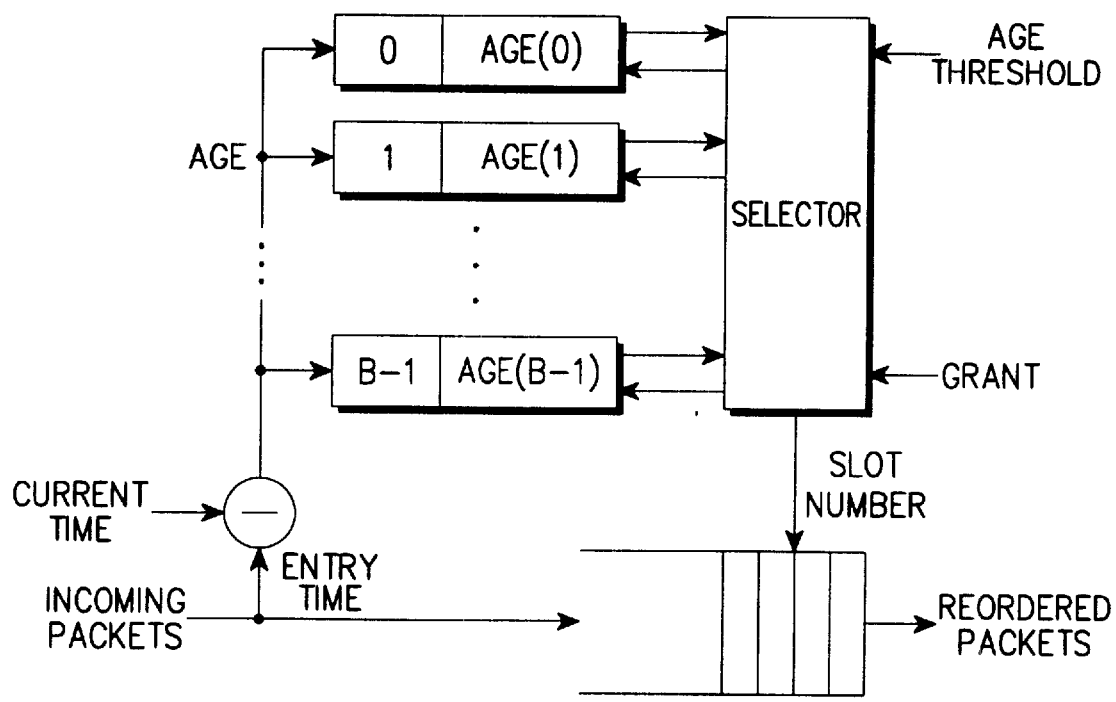

FIG. 1 illustrates the circuit of such a prior art data cell re-sequencer, which is based on U.S. Ser. No. 005339311A entitled as "Data Packet Re-sequencer, filed by Jonathan S. Turner of Washington University. The circuit is designed to provide a time stamp by the common clock for representing the time of that a cell reaches the switch. In addition, the number of the slots to be selected by the selector of the buffer controller is limited by the number of the physical hardware which correspond to the number of AGE's, namely "B". This system does not provide such cell re-sequencing buffer as it may be required to cope with the various number of the data cell slots for meeting various traffic characteristics. Further, as the number of the data cell slots is increased—for example, to meet an increase in Internet data traffic—the number of the control circuit should be increased also.

SUMMARY OF THE INVENTION

It is an object of the present invention to provide a cell re-sequencer for re-sequencing the ATM cells switched through the multiple paths so as to keep their original sequence in an ATM switching system, and a method thereof.

It is another object of the present invention to provide a cell re-sequencer for re-sequencing the ATM cells switched through the multiple paths based on the real delay that is the time difference between the input time of a data cell reaching the switching network of the ATM switching system and the output time of the cell leaving the switching network.

It is still another object of the present invention to provide a data cell re-sequencer for re-sequencing the ATM data cells switched through the multiple paths, which may provide a number of data cell slots to meet various traffic characteristics by initializing software.

According to an aspect of the present invention, a data cell re-sequencer for re-sequencing the data cells switched by an ATM switching system includes a maximum delay register for setting the maximum delay value by initializing for output the maximum delay value according to internal clock pulses, a base address increment register for incrementing the initial value of the initialization set as a base address one by one according to data cell time clock pulses, a delay detector for detecting the real delay of a data cell from its header, a data cell storing address generator for adding the base address to the delay difference between the maximum delay and real delay to generate a data cell storing address, a multiplexer for multiplexing the base address and data cell storing address according to the cell time clock pulses, and a memory address register for temporarily storing the output of the multiplexer.

The cell storing address generator can further comprise a subtractor for subtracting the real delay from the maximum delay to generate the delay difference, and an adder for adding the base address and delay difference.

The maximum delay value set by the maximum delay register can be determined by a maximum number of the slots for storing the cells switched by the ATM switching system.

The real delay can be the time difference between the input time of a cell reaching the switching network of the ATM switching system and the output time of the cell leaving the switching network.

The multiplexer may output the cell storing address at the rising edges of the cell time clock pulses and output the base address at the falling edges of the cell time clock pulses.

Another embodiment of a cell re-sequencer for re-sequencing the cells switched by an ATM switching system comprises:

a maximum delay register for setting a maximum delay value as an initial value by initializing an output of the maximum delay value according to internal clock pulses;

a base address increment register for increasing an initial value of an initialization set as a base address one by one according to cell time clock pulses;

a delay detector for detecting the real delay of a cell from its header;

a cell storing address generator for adding the base address to the delay difference between the maximum delay and real delay to generate a cell storing address;

a multiplexer for multiplexing the base address and cell-storing address according to the cell time clock pulses;

a memory address register for temporarily storing the output of the multiplexer;

a cell buffer for buffering said cells according to the internal clock pulses;

a memory buffer register for temporarily storing the cells from the cell buffer; and, a cell buffer memory for storing the cells from the memory buffer register at the corresponding cell storing addresses provided from the memory address register to generate the cells according to the corresponding base addresses from the memory address register.

The above re-sequencer may further comprise a first flip-flop for latching the cell-receiving signal of the cell buffer representing the input of a cell;

a memory allocation map for storing the valid cell information of the cell at a cell storing address from the memory address register according to the cell receiving signal; and a second flip-flop for latching the valid cell information.

The cell storing address generator may further includes a subtractor for subtracting the real delay from the maximum delay to generate the difference, and an adder for adding the base address and delay difference.

The maximum delay value set by the maximum delay register is determined by the maximum number of the slots for storing the cells switched by the ATM switching system.

The real delay can be the time difference between the input time of a cell reaching the switching network of the ATM switching system and the output time of the cell leaving the switching network.

The multiplexer may output the cell storing address at the rising edges of the cell time clock pulses and output the base address at the falling edges of the cell time clock pulses.

A first method of re-sequencing the cells switched by an ATM switching system, comprises the steps of:

(a) setting the maximum delay value by initializing an output of the maximum delay value according to internal clock pulses;

(b) increasing an initial value of an initialization set as a base address one by one according to cell time clock pulses;

(c) detecting the real delay of a cell from its header;

(d) adding the base address to the delay difference between the maximum delay and real delay to generate a cell storing address; and, (e) multiplexing the base address and cell storing address according to the cell time clock pulses.

In a variation of the above method the address generation in step (d) further includes:

(1) subtracting the real delay from said maximum delay to generate the delay difference; and (2) adding the base address and delay difference, wherein said maximum delay value in step (a) is determined by the maximum number of the slots for storing the cells switched by said ATM switching system.

In the above method, the real delay in step (c) may be equal to the time difference between the input time of a cell reaching the switching network of the ATM switching system and the output time of the cell leaving the switching network.

In the above method, the multiplexing in step (e) can comprise: (1) outputting the cell-storing address at the rising edges of the cell time clock pulses and (2) outputting the base address at the falling edges of the cell time clock pulses.

In a second method of re-sequencing the cells switched by an ATM switching system, comprises the steps of:

(a) setting the maximum delay value by initializing an output of the maximum delay value according to internal clock pulses;

(b) increasing an initial value of an initialization set as a base address one by one according to cell time clock pulses;

(c) detecting the real delay of a cell from its header;

(d) adding the base address to the delay difference between the maximum delay and real delay to generate a cell storing address;

(e) multiplexing the base address and cell storing address according to the cell time clock pulses;

(f) temporarily storing the base address and cell storing address;

(g) buffering the cells according to said internal clock pulses;

(h) temporarily storing the cells from the cell buffer; and, (i) storing the cells at the corresponding cell storing addresses to generate the cells according to the corresponding base addresses.

The above second method can further including the steps of:

latching the cell-receiving signal representing the input of a cell;

(k) storing the valid cell information of the cell at a cell storing address according to the cell receiving signal; and, (l) latching the valid cell information.

In the above second method, the address generation in step (d) can further include (1) subtracting the real delay from said maximum delay to generate said delay difference, and (2) adding the base address and delay difference.

In the above second method, the maximum delay value set in step (a) can be determined by the maximum number of the slots for storing the cells switched by the ATM switching system.

In the above second method, the real delay detected in step (c) can be equal to the time difference between the input time of a cell reaching the switching network of said ATM switching system and the output time of said cell leaving said switching network.

In the above second method, the multiplexing in step (e) includes (1) outputting the cell-storing address at the rising edges of the cell time clock pulses; and, (2) outputting the base address at the falling edges of the cell time clock pulses.

The present invention will now be described more specifically with reference to the attached drawings. Such drawings are presented for illustrative purposes of one embodiment of the invention and are not intended to limit the scope of the invention to the embodiment shown.

A BRIEF DESCRIPTION OF THE ATTACHED DRAWINGS

Figure 2:
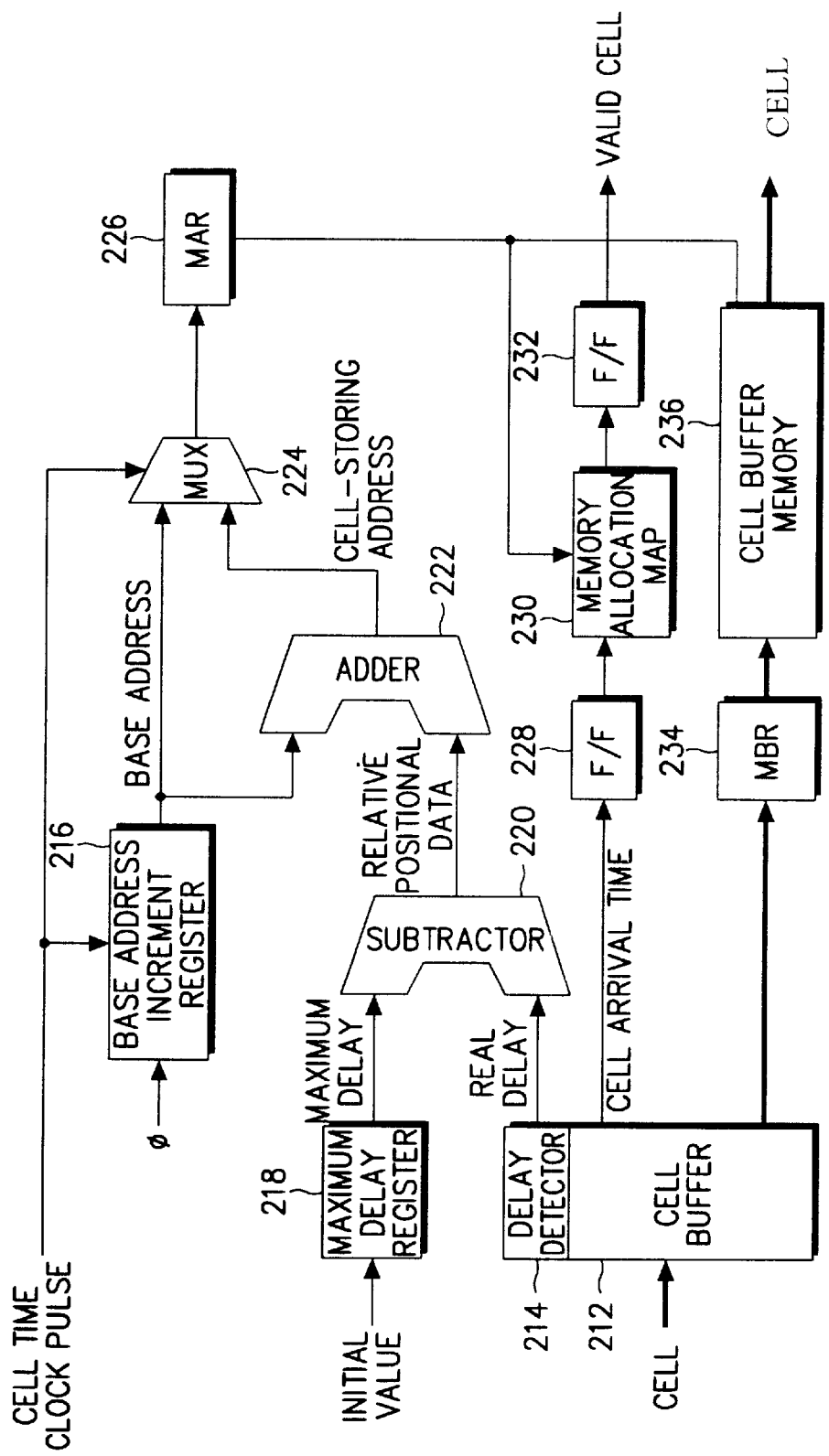

FIG. 1 is a block diagram for illustrating a conventional cell re-sequencer, and FIG. 2 is a block diagram for illustrating the inventive cell re-sequencer.

A DETAILED DESCRIPTION OF THE PREFERRED EMBODIMENT

In the following description, for purposes of explanation rather than limitation, specific details are set forth such as particular architecture, interfaces, techniques, etc., in order to provide a thorough understanding of the present invention. However, it will be apparent to those skilled in the art that the present invention may be practiced in other embodiments that depart from these specific details.

Referring to FIG. 2, a maximum delay register 218 is initialized to have an initial value, which will be referred to as the maximum delay value for providing the maximum number of slots for storing the ATM cells, outputted according to the internal clock pulses. A base address increment register 216 is initialized to "0", storing the address of an arbitrary input circular queue for storing the cells. Namely, it stores the address of the next output cell by sequentially increasing the address according to external cell time clock pulses. The address output from the base address increment register 216 is referred to as "base address." A cell buffer 212 buffers the cells coming from the switching network each with a header containing a delay value, which is generated as a real delay by a delay detector 214. In addition, the cell buffer 212 generates a cell arrival signal upon receiving a cell.

A cell buffer memory 236 stores the cells at respective addresses externally designated. A memory allocation map 230 provides each cell with a single bit memory region to store the valid data of the cell according to the corresponding cell arrival signal from the cell buffer 212. In this case, the address of the valid data stored in the memory allocation map 230 is the same as that of the cell stored in the cell buffer memory 236. This is to easily match the valid data stored in the memory allocation map 230 with the corresponding cell stored in the cell buffer memory 236 by the address supplied from the memory address register 226.

A subtractor 220 subtracts the real delay provided by the delay detector 214 from the maximum delay provided by the maximum delay register 218 so as to generate a relative position delay representing the delay difference. An adder 222 adds the base address from the base address increment register 216 and the delay difference from the subtractor 220 to generate the cell storing address designating the position to store the cell from the adder in the cell buffer memory 236 and the memory allocation map 230. The following Equation 1 expresses the cell storing address:

$$A_w = D_{Max} - D_{Real} + A_{Base} \quad \text{Equation 1}$$

wherein $A_w$ represents the cell storing address, $D_{Max}$ maximum delay, $D_{Real}$ real delay, and $A_{Base}$ base address.

A multiplexer 224 alternately outputs the base address and cell storing address according to the cell time clock pulses. For example, it outputs the cell storing address at the rising edge of the cell time clock pulse to store the cell, and the base address at the falling edge of the clock pulse to retrieve the cell. A flip-flop 228 provided before the memory allocation map 230 is to latch the cell arrival signal while a flip-flop 232 after the memory allocation map 230 is to latch the valid data bit retrieved from it. As described above, the function of memory address register (MAR) 226 is to temporarily store the output data of the multiplexer 224. Meanwhile, a memory buffer register (MBR) 234 is to buffer the cells from the cell buffer 212.

In operation, the maximum delay register 218 is initialized to have an initial value determined by the maximum number of slots for storing the cells while the base address increment register 216 is initialized to have its initial value set to "0", designating the base address increased one by one in the circular queue according to the cell time clock pulses. Namely, the base address is increased whenever the base address increment register 216 receives a cell.

The cell applied from the switching network to the cell buffer 212 has a header containing a delay value representing its delay in the switching network. The delay value is detected by the delay detector 214 to generate the real delay by calculating the difference between the time of the cell entering the switching network recorded in the header and the time of the cell entering the cell buffer 212. The real delay is applied to the subtractor 220, which subtracts the real delay from the maximum delay provided by the maximum delay register 218 to generate the relative positional data determining the address to store the cell in the cell buffer memory 236. The adder 222 adds the relative positional address from the subtractor 220 and the base address from the base address increment register 216 to generate the final cell storing address. Of course, the calculation of the subtractor 220 and the adder 222 is performed by Equation 1.

The multiplexer (MUX) 224 alternately outputs the cell storing address and base address to MAR 226 according to the cell time clock pulses. For example, the cell storing address is generated at the rising edge of the cell time clock pulse to store the cell from the cell buffer 212 into the cell buffer memory 236 while the base address is generated at the falling edge to retrieve the cell from the cell buffer memory 236. Meanwhile, the cell buffer 212 generates the cells to MBR 234 according to the internal clock pulses, subsequently stored into the cell buffer memory 236 according to the respective cell storing addresses supplied from MAR 226.

In addition, when the cell buffer 212 generates the cell arrival signal, F/F 228, the memory allocation map 230 and F/F 232 work to determine whether or not the cell is valid. Namely, the cell arrival signal is latched by F/F 228 and delivered to the memory allocation map 230, which stores the valid cell information determined on the basis of the cell arrival signal into a bit region corresponding to the address provided by MAR 226. In this case, the address of the valid cell information stored in the memory allocation map 230 is the same as that of the corresponding cell stored in the cell buffer memory 236.

Thus, according to the base address supplied by MAR 226, the cell buffer memory 236 generates the cell, and the memory allocation map 230 generates the valid cell data, which is latched by F/F 232 for determining whether or not the cell generated from the cell buffer memory 236 is valid. On the contrary, according to the cell storing address supplied by MAR 226, the cell buffer memory 236 stores the cell while the memory allocation map 230 stores the valid cell information. Hence, the storing and retrieving of the cell are alternately performed according to the output of MUX 224 alternating between the cell storing address and base address as the cell time clock pulses rise and fall.

In this way, the inventive cell re-sequencer may adjust the number of the slots of the buffer controller for storing the cells by employing the time of the cell entering the switching network and by using the initialization software without using the physical hardware, consequently meeting the requirements of heavy traffic such as internet data traffic without increasing the control circuit.

While the present invention has been described in connection with specific embodiments accompanied by the attached drawings, it will be readily apparent to those skilled in the art that various changes and modifications may be made thereto without departing from the scope of the appended claims.

What is claimed is:

1. A cell (data packet) re-sequencer for re-sequencing the cells switched by an ATM switching system, comprising:
   a maximum delay register for setting a maximum delay as an initial value by initializing an output of said maximum delay value according to internal clock pulses;

a base address increment register for increasing an initial value of an initialization set as a base address one by one according to cell time clock pulses;

a delay detector for detecting the real delay of a cell from its header;

a cell storing address generator for adding said base address to the delay difference between said maximum delay and real delay to generate a cell storing address;

a multiplexer for multiplexing said base address and cell storing address according to said cell time clock pulses; and, a memory address register for temporarily storing an output of said multiplexer.

2. The cell re-sequencer as defined in claim 1, wherein said cell storing address generator further comprises a subtractor for subtracting said real delay from said maximum delay to generate said delay difference, and an adder for adding said base address and delay difference.

3. The cell re-sequencer as defined in claim 1, wherein said maximum delay value set by said maximum delay register is determined by a maximum number of the slots for storing the cells switched by said ATM switching system.

4. The cell re-sequencer as defined in claim 3, wherein said real delay is the time difference between the input time of a cell reaching the switching network of said ATM switching system and the output time of said cell leaving said switching network.

5. The cell re-sequencer as defined in claim 1, wherein said multiplexer outputs said cell storing address at the rising edges of said cell time clock pulses and said base address at the falling edges.

6. A cell (data packet) re-sequencer for re-sequencing the cells switched by an ATM switching system, comprising:

a maximum delay register for setting a maximum delay value as an initial value by initializing an output of said maximum delay value according to internal clock pulses;

a base address increment register for increasing an initial value of an initialization set as a base address one by one according to cell time clock pulses;

a delay detector for detecting the real delay of a cell from its header;

a cell storing address generator for adding said base address to the delay difference between said maximum delay and real delay to generate a cell storing address;

a multiplexer for multiplexing said base address and cell-storing address according to said cell time clock pulses;

a memory address register for temporarily storing the output of said multiplexer;

a cell buffer for buffering said cells according to said internal clock pulses;

a memory buffer register for temporarily storing said cells from said cell buffer; and, a cell buffer memory for storing said cells from said memory buffer register at the corresponding cell storing addresses provided from said memory address register to generate said cells according to the corresponding base addresses from said memory address register.

7. The cell re-sequencer as defined in claim 6, further including:

a first flip-flop for latching the cell-receiving signal of said cell buffer representing the input of a cell;

a memory allocation map for storing the valid cell information of said cell at a cell storing address from said memory address register according to said cell receiving signal; and, a second flip-flop for latching said valid cell information.

8. The cell re-sequencer as defined in claim 7, wherein said cell storing address generator further comprises a subtractor for subtracting said real delay from said maximum delay to generate said difference, and an adder for adding said base address and delay difference.

9. The cell re-sequencer as defined in claim 7, wherein said maximum delay value set by said maximum delay register is determined by the maximum number of the slots for storing the cells switched by said ATM switching system.

10. The cell re-sequencer as defined in claim 9, wherein said real delay is the time difference between the input time of a cell reaching the switching network of said ATM switching system and the output time of said cell leaving said switching network.

11. The cell re-sequencer as defined in claim 7, wherein said multiplexer outputs said cell storing address at the rising edges of said cell time clock pulses and outputs said base address at the falling edges of said cell time clock pulses.

12. A method of re-sequencing the cells switched by an ATM switching system, said method comprising the steps of:

(a) setting the maximum delay value by initializing an output of said maximum delay value according to internal clock pulses;

(b) increasing an initial value of an initialization set as a base address one by one according to cell time clock pulses;

(c) detecting the real delay of a cell from its header;

(d) adding said base address to the delay difference between said maximum delay and real delay to generate a cell storing address; and, (e) multiplexing said base address and cell storing address according to said cell time clock pulses.

13. The method as defined in claim 12, wherein said step (d) further includes:

(1) subtracting said real delay from said maximum delay to generate said delay difference, and (2) adding said base address and delay difference.

14. The method as defined in claim 12, wherein said maximum delay value in said step (a) is determined by the maximum number of the slots for storing the cells switched by said ATM switching system.

15. The method as defined in claim 14, wherein said real delay in said step (c) is equal to the time difference between the input time of a cell reaching the switching network of said ATM switching system and the output time of said cell leaving said switching network.

16. The method as defined in claim 12, wherein said step (e) further comprises: (1) outputting said cell-storing address at the rising edges of said cell time clock pulses, and (2) outputting said base address at the falling edges of said cell time clock pulses.

17. A method of re-sequencing the cells switched by an ATM switching system, said method comprising the steps of:

(a) setting the maximum delay value by initializing an output of said maximum delay value according to internal clock pulses;

(b) increasing an initial value of an initialization set as a base address one by one according to cell time clock pulses;

(c) detecting the real delay of a cell from its header;

(d) adding said base address to the delay difference between said maximum delay and real delay to generate a cell storing address;

(e) multiplexing said base address and cell storing address according to said cell time clock pulses;

(f) temporarily storing said base address and cell storing address;

(g) buffering said cells according to said internal clock pulses;

(h) temporarily storing said cells from said cell buffer; and, (i) storing said cells at the corresponding cell storing addresses to generate said cells according to the corresponding base addresses.

18. The method as defined in claim 17, wherein said method further including the steps of:

(j) latching the cell-receiving signal representing the input of a cell;

(k) storing the valid cell information of said cell at a cell storing address according to said cell receiving signal; and, (1) latching said valid cell information.

19. The method as defined in claim 18, wherein said step (d) further includes:

(1) subtracting said real delay from said maximum delay to generate said delay difference, and (2) adding said base address and delay difference.

20. The method as defined in claim 18, wherein said maximum delay value set in said step (a) is determined by the maximum number of the slots for storing the cells switched by said ATM switching system.

21. The method as defined in claim 20, wherein said real delay detected in said step (c) is equal to the time difference between the input time of a cell reaching the switching network of said ATM switching system and the output time of said cell leaving said switching network.

22. The method as defined in claim 18, wherein said step (e) includes: (1) outputting said cell-storing address at the rising edges of said cell time clock pulses, and (2) outputting said base address at the falling edges of said cell time clock pulses.

* * * * *

UNITED STATES PATENT AND TRADEMARK OFFICE
CERTIFICATE OF CORRECTION

PATENT NO.    : 6,434,148 B1
DATED         : August 13, 2002
INVENTOR(S)   : Jae-Hyun Park It is certified that error appears in the above-identified patent and that said Letters Patent is hereby corrected as shown below:

<u>Title page,</u>
Item [73], Assignee, the patent should reflect the following as assignee:

-- Samsung Electronics Co., Ltd.
   416 Maetan-Dong, Paldal-Gu
   Suwon-City, Kyungki-do, Korea
   Republic of Korea --

Signed and Sealed this

Twelfth Day of October, 2004

JON W. DUDAS
*Director of the United States Patent and Trademark Office*